United States Patent [19]

Keleshian

[11] 3,800,384
[45] Apr. 2, 1974

[54] BEARING STRUCTURE AND METHOD OF FORMING SAME

[75] Inventor: John V. Keleshian, Elmwood Park, Ill.

[73] Assignee: Aetna Bearing Company, Chicago, Ill.

[22] Filed: Dec. 4, 1972

[21] Appl. No.: 312,039

[52] U.S. Cl............. 29/148.4 A, 308/189, 308/196
[51] Int. Cl............................................ B23p 11/00
[58] Field of Search............... 29/148.4 A, 148.4 R; 308/189, 196

[56] References Cited
UNITED STATES PATENTS
3,213,518  10/1965  Saito .......................... 29/148.4 A
3,418,704  12/1968  Oddsen ....................... 29/148.4 A Primary Examiner—Thomas H. Eager
Attorney, Agent, or Firm—Olson, Trexler, Wolters, Bushnell & Fosse, Ltd.

[57] ABSTRACT

A method as disclosed of forming a bearing structure having at least one race element thereof, constructed of a pair of sheet metal blanks having mating annular configurations forming the race for the bearing. The mating annular configurations are formed by first stamping a conical preform portion radially about a hole within the blank. The conical preform is then reverse bent while restraining the extent thereof in a space which causes reverse forging of the material of the preform so that the thickness thereof increases during bending for added strength of the bearing structure.

10 Claims, 7 Drawing Figures

PATENTED APR 2 1974 3,800,384

PRIOR ART

BEARING STRUCTURE AND METHOD OF FORMING SAME

BACKGROUND OF THE INVENTION

This invention relates generally to a bearing structure and method of forming the same, and more particularly to a bearing structure wherein at least one of the race elements is formed of sheet metal stamping.

Heretofore, bearings have been made wherein at least one of the race elements thereof is formed of the sheet metal stampings which are punched and stamped in conventional die apparatus. When an annular configuration of a sheet metal blank is bent axially of a precut hole formed therein, the metal along the bend line and extending therefrom to the peripheral edge is somewhat stretched and thinned. This stretching and thinning of the sheet metal causes a weakening of the bearing structure so that undesired premature failure sometimes occurs. This is particularly true during wear of the bearing when the race portion thereof is in direct contact with the ball or roller elements between the races causing further thinning of the material.

SUMMARY OF THE INVENTION

Accordingly, it is an object of this invention to provide a new and improved bearing structure which has added strength in the region of the race which is formed by bending of the sheet metal.

Another object of this invention is to provide a simple method of forming a bearing race element of sheet metal blanks without causing stretching and thinning of the sheet metal in the region of the race.

Another object of this invention is to provide a bearing structure which is efficient and reliable in operation and inexpensive to manufacture.

Briefly, the method of this invention contemplates reverse forging of a portion of a sheet metal blank so that during the bending of a peripheral configuration forming a bearing race the sheet metal material is caused to expand as a result of the compression exerted during the reverse forging operation. This reverse forging causing increased thickness of the sheet metal for added strength and longer life. Preferably the bearing structure disclosed herein is intended for use with a plurality of ball bearing elements positioned between diametrically opposed radially aligned race elements so that a load can be supported by a plurality of ball bearing units located therebetween. There are many applications for such bearing structures.

Accordingly, many other objects, features, and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
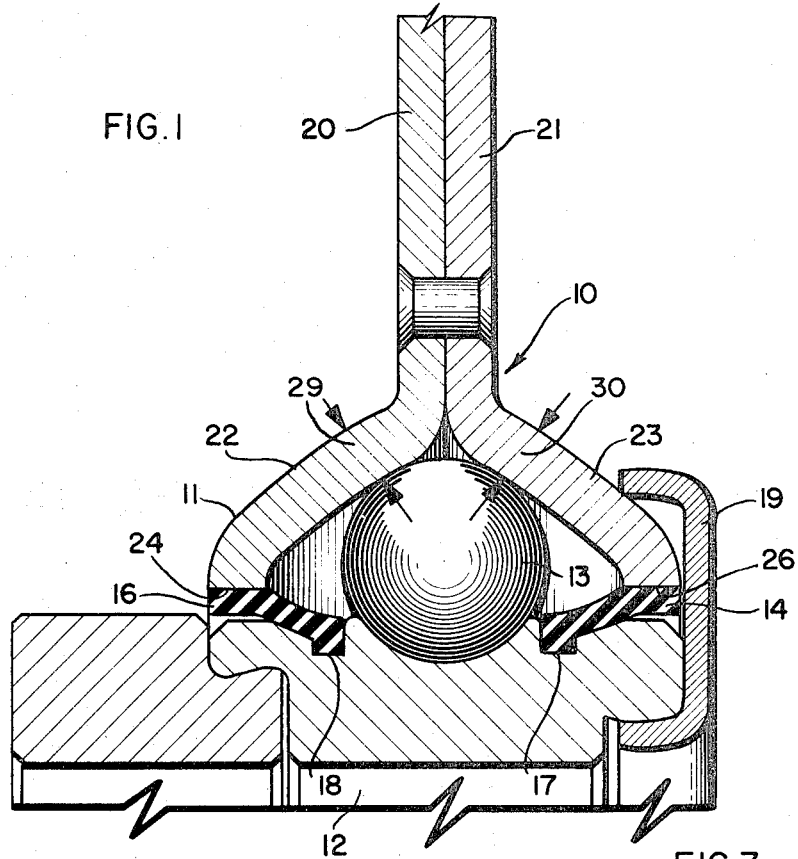
FIG. 1 is an enlarged sectional view of a portion of a bearing structure showing the novel concepts of this invention.

Referring now to FIG. 1, there is seen a partial cross section through a bearing unit which is constructed in accordance with the principles of this invention and is designated generally by reference numeral 10. The bearing structure 10 includes first and second bearing race elements 11 and 12, here being designated the outer and inner race elements, respectively. The outer race element 11 preferably is constructed of sheet metal components stamped and bent to form the configuration shown. It will be understood that the inner race element also can be constructed of sheet metal components if desired. Located between the outer and inner race elements 11 and 12 are a plurality of spherical ball bearings 13 which provide load bearing elements between the races for smooth rotary motion therebetween. A pair of seals 14 and 16 are secured to the inner race element 12 by engagement with annular grooves 17 and 18, respectively. The seal members extend axially therefrom and terminate at a distance corresponding to the axial extend of the outer race member 11. A shield 19 circumscribes the peripheral portion of the outer and inner race members in a conventional manner to eliminate the possibility of dust or small objects from getting into the grease packed bearing housing containing the ball bearings 13.

In accordance with the principles of this invention, the outer race member 11 is constructed of a pair of sheet metal blanks, 20 and 21, stamped from a large sheet by the use of a punch press or the like, and fashioned to provide a pair of annular configurations, 22 and 23, respectively, which cooperate, one with the other, to form a radially, inwardly directed race surface upon which the ball bearings 13 engage. The innermost peripheral portion of the annular configurations 22 and 23 form seal surfaces 24 and 26, respectively, to engage with the seals 16 and 14. This will retain a quantity of grease injected into the bearing confinement for lubrication of the ball bearings 13 during use.

Most advantageously, the annular configurations 22 and 23 of the sheet metal blanks 20 and 21 have increased thickness area portions 29 and 30, respectively, preferably immediately opposite the annular race surface engaging the ball bearing 13. This increased wall thickness is accomplished in accordance with the method of this invention so as to substantially increase the strength of the bearing structure, particularly in the region of normal wear to provide a bearing structure which has extended life. This increased wall thickness of the annular race surface is in dramatic contradistinction to the usual case of prior art bearings wherein stamping of sheet metal blanks usually result in thinning and weakening of the sheet metal material in this region.

Figure 3:
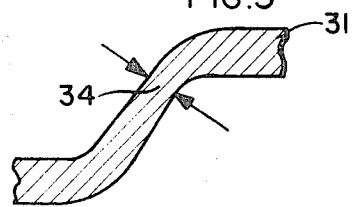
FIG. 3 is an enlarged fragmentary, sectional view of a portion of the sheet metal plate formed in the apparatus of FIG. 2, thus showing the stretching and thinning of the bearing structure in the region of the race.
Figure 2:
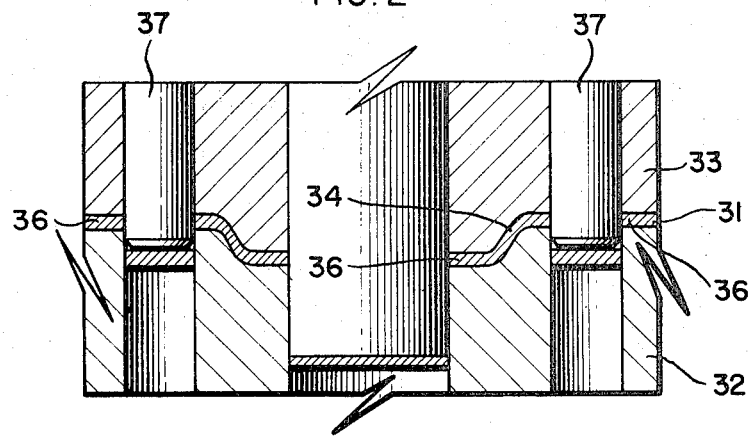
FIG. 2 is a sectional view through a cutting and forming apparatus showing how bearing race element of sheet metal were formed heretofore, and is labeled prior art.

For a better understanding of the prior art deficiencies, reference is now made to FIGS. 2 and 3 which shows, in elevated cross section, a forming die and a punch arrangement which was used to form bearing element from sheet metal blanks. Here a sheet metal blank, 31, is formed between a pair of punch and die members 32 and 33 so that an annular portion 34 is displaced axially along the center line of a hole 36 formed therein. This annular portion 34 is shown in greater detail in FIG. 3 and it can be seen that the wall portion thereof is thinned as a result of stretching during bending. To lighten the sheet metal blank 31, a plurality of apertures 36 are formed therein by means of evenly spaced apart punch members 37 which preferably lie on a common circumference about the axis of the hole 36.

To overcome the inherent thinning of the wall structure due to bending, the method of this invention contemplates the procedure of reverse forging of the sheet metal blank during a second bending operation which causes a desirable thickening of the sheet metal in this region. This is best illustrated in FIGS. 4, 5, 6 and 7, showing the method of this invention.

Figure 4:
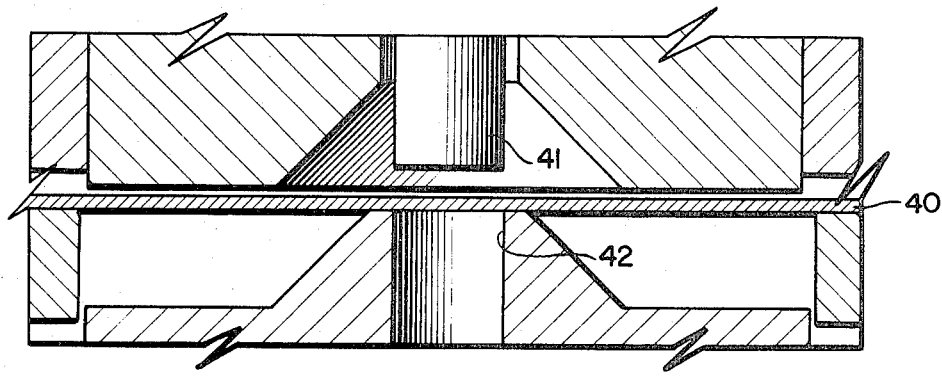
FIG. 4 is a sectional view through an apparatus which is used to form a preform of sheet metal so that a race element can be constructed in accordance with the principles of this invention.
Figure 5:
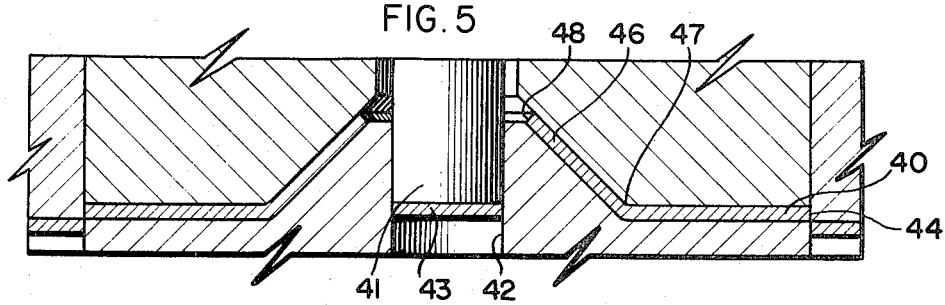
FIG. 5 shows the apparatus of FIG. 4 in its cut and collapsed condition for trimming and bending a conical preform on the sheet metal material.

In FIG. 4 a sheet metal blank 40 is positioned between a punch and die 41 and 42, respectively, to form a hole through the central portion of the blank by knocking out a slug 43 therefrom. Also, the annular periphery of the blank is formed by a cutting edge 44, this being circular in configuration in the preferred embodiment. Further movement of the spaced apart punch and die elements 41 and 42, as shown in FIG. 5, will cause a conical preform 46 to be bent axially of the hole formed therein so that an annular bend line 47 is formed concentrically about the hole. The terminating edge of the conical preform is indicated by reference numeral 48 and is now displaced from the punch 41 as a result of the axial bending of the material. This bending, in the region of the bend line 47, may cause slight stretching of the sheet metal blank during this initial preform operation.

Figure 6:
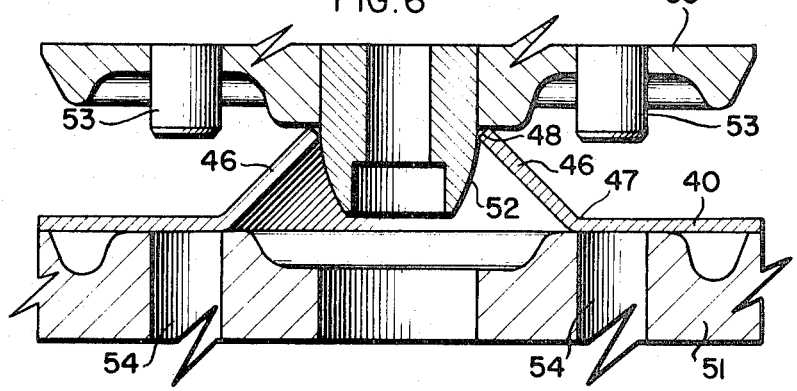
FIG. 6 illustrates a second forming apparatus which receives the sheet metal balnk so that the preform thereof is confined during a reverse bending operation, thus causing reverse forging of the preform for thickening of the material.
Figure 7:
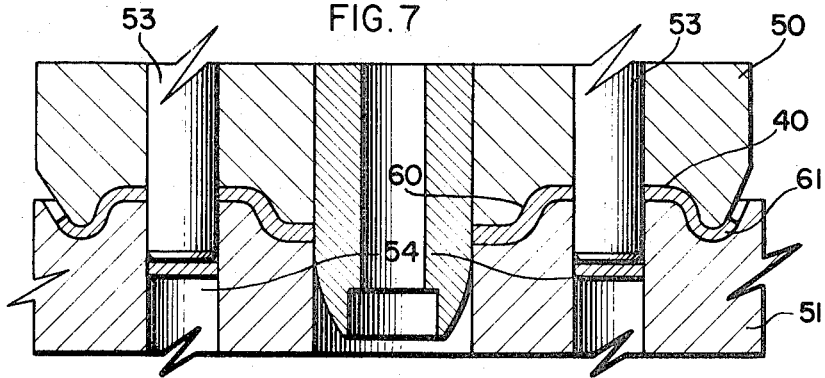
FIG. 7 illustrates the apparatus of FIG. 6 in its fully depressed condition showing the sheet metal stamping thus forming a section of a race element of FIG. 1 in accordance with the principles of this invention.

In FIG. 6 the sheet metal blank 40, including the conical preform 46 formed thereon, is positioned in a second forming press having spaced apart press sections 50 and 51 and a depending support element 52 centrally thereof. The depending support element 52 acts both as a guide so that the sheet metal blank 40 is accurately positioned between the dies 50 and 51 and as a stop member to confine the conical preform during the reverse forging. The plurality of punches 53 cooperate with die apertures 54 to serve both as a punching mechanism and to firmly hold the sheet metal blank 40 during this second forming operation. Preferably the punches 53 and die openings 54 are positioned relatively close to the annular bend line 47 so that the entire extent of the conical preform between the bend line 47 and the peripheral edge 48 of the hole is confined firmly. As the die sections 50 and 51 are brought together, the material forming the preform 46 is pushed together or reverse forged because of the fact that the extent thereof is greater than the extent of the finished product as seen in FIG. 7. Accordingly, the thickness of the material in the region 60 which is to form the annular track of the race is increased during this second forming operation.

The punches 53 and the die openings 54 will provide a plurality of annular apertures within the sheet metal blank 40. In the embodiment illustrated herein the outward periphery of the sheet metal blank is turned downwardly and then upwardly as shown by reference numeral 61 so that when two such race elements are secured together, a C-shaped gripping periphery is provided for holding a resilient roller element or the like.

While the method of increasing the thickness of sheet metal material during a bending operation preferably is used in forming bearing elements, it will be understood that this method can be used for increasing the thickness of other components when desired. Accordingly, variations and modifications of this invention may be effected without departing from the spirit and scope of the novel concepts disclosed and claimed herein.

The invention is claimed as follows:

1. A method of forming an article from a sheet metal stamping, comprising the steps of: bending a sheet metal blank to form a preform portion between a bend line and a peripheral edge of the blank, said preform portion having an extent greater than the final extent of the article being formed, bending said preform in a direction opposite that of the first bend forming the same while restraining the preform in a space of lesser extent to cause reverse forging of the preform for increasing the thickness of the sheet metal in the region of the preform as the result of continued reverse forging thereof until the ultimate configuration of the article is achieved.

2. A method of forming an article from a sheet metal stamping, comprising the steps of: punching a hole through a sheet metal blank from which the article is to be formed, bending said sheet metal blank in an axial direction to form a preform conic portion radially about said hole, said conic portion being defined between said hole and a circular bend line radially outwardly therefrom, the longitudinal extent of said conic portion between said hole and said circular bend line being greater than the extent of the finished article being formed, and bending said conic portion in a direction opposite that of forming the same while restraining the conic portion between said hole and said circular bend line in a space of lesser extent to cause reverse forging thereof.

3. The method of forming an article according to claim 2 wherein the thickness of the material between said hole and said circular bend line increases during the reverse forging thereof.

4. A method of forming a bearing race element, comprising the steps of: punching holes through at least a pair of sheet metal blanks which are to form the bearing race element, bending each of said sheet metal blanks in an axial direction to form a preform conical portion radially about said holes, each of said conical portions being defined between said hole and a circular bend line radially outwardly therefrom, the longitudinal extent of said conic portion between said hole and said circular bend line being greater than the extent of the bearing race element to be formed thereby, bending said conic portions in a direction opposite that of forming the same while restraining the conic portion between said hole and said circular bend line in a space of lesser extent to cause reverse forging thereof, and joining said pair of sheet metal blanks together to form an annular bearing race element.

5. The method of forming a bearing race element according to claim 4 wherein the thickness of the material between said hole and said circular bend line increases during the reverse forging thereof.

6. The method of forming a bearing race element according to claim 4 wherein the thickness of the material between said hole and said circular bend line increases during the reverse forging thereof, this increased thickness being in coincidence with an annular contact raceway which is to engage a plurality of ball bearings.

7. The method of forming the bearing race element according to claim 4 wherein said at least two sheet metal blanks are riveted together to form the bearing race element.

8. A bearing structure comprising; first and second spaced apart race elements, a plurality of roller bearing elements positioned between said first and second race elements to provide rotatable load receiving members therebetween, wherein the improvement comprises, at least one of said first and second spaced apart race elements being formed of a pair of sheet metal stampings of predetermined thickness, said pair of sheet metal stampings being bent to form mating annular configurations which receive said plurality of roller bearing elements to make contact with an annular track formed in said race element, said sheet metal stampings having a thickness in the region of said annular track greater than said predetermined thickness.

9. The bearing structure of claim 8 wherein the increased thickness of the sheet metal material in the region of said annular track is reverse forged.

10. The bearing structure of claim 8 wherein said mating annular configuration is directed radially inwardly.

* * * * *